(12) United States Patent
Deshpande et al.

(10) Patent No.: US 10,120,930 B2
(45) Date of Patent: *Nov. 6, 2018

(54) IDENTIFYING ENTITY MAPPINGS ACROSS DATA ASSETS

(71) Applicant: International Business Machines Corporation, Armonk, NY (US)

(72) Inventors: Prasad M. Deshpande, Bangalore (IN); Atreyee Dey, Bangalore (IN); Rajeev Gupta, Noida (IN); Sanjeev K. Gupta, Los Altos, CA (US); Salil Joshi, Pune (IN); Sriram K. Padmanabhan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 224 days.

This patent is subject to a terminal disclaimer.

(21) Appl. No.: 15/268,400

(22) Filed: Sep. 16, 2016

(65) Prior Publication Data

US 2017/0075898 A1     Mar. 16, 2017

Related U.S. Application Data

(63) Continuation of application No. 14/853,823, filed on Sep. 14, 2015, now Pat. No. 10,025,846.

(51) Int. Cl.
*G06F 17/30* (2006.01)

(52) U.S. Cl.
CPC .. *G06F 17/30604* (2013.01); *G06F 17/30303* (2013.01); *G06F 17/30622* (2013.01);
(Continued)

(58) Field of Classification Search
CPC ......... G06F 17/30604; G06F 17/30303; G06F 17/30622; G06F 17/30867; G06F 17/30908; G06F 17/30917
(Continued)

(56) References Cited

U.S. PATENT DOCUMENTS 6,301,584 B1   10/2001   Ranger
7,043,492 B1    5/2006   Neal et al.
(Continued)

OTHER PUBLICATIONS

Office Action, dated Sep. 11, 2017, for U.S. Appl. No. 14/853,823, filed Sep. 14, 2015, invented by Prasad M. Deshpande et al., Total 17 pages.
(Continued)

*Primary Examiner* — Robert Stevens
(74) *Attorney, Agent, or Firm* — Janaki K. Davda; Konrad, Raynes, Davda and Victor LLP

(57) ABSTRACT

Entity mappings that produce matching entities for a first data asset having attributes and a second data asset having attributes are generated by: generating entity mappings that produce matching entities for a first data asset having attributes with attribute values and a second data asset having attributes with attribute values by: matching the attribute values of the attributes of the first data asset with the attribute values of the attributes of the second data asset, using the matching attribute values to generate matching attribute pairs, and using the matching attribute pairs to identify entity mappings; computing an entity mapping score for each of the entity mappings based on a combination of factors; ranking the entity mappings based on each entity mapping score; and using some of the ranked entity mappings to determine whether a same real-world entity is described by the first data asset and the second data asset.

8 Claims, 18 Drawing Sheets

(52) U.S. Cl.
CPC .. *G06F 17/30867* (2013.01); *G06F 17/30908* (2013.01); *G06F 17/30917* (2013.01)

(58) Field of Classification Search
USPC .......................................................... 707/723
See application file for complete search history.

(56) References Cited

U.S. PATENT DOCUMENTS

| | | | |
|---|---|---|---|
| 7,580,946 | B2 | 8/2009 | Mansour et al. |
| 7,743,078 | B2 | 6/2010 | Azvine et al. |
| 8,166,013 | B2 | 4/2012 | Bandaru et al. |
| 8,355,905 | B2 | 1/2013 | Fokoue-Nkoutche et al. |
| 8,504,583 | B1 | 8/2013 | Ke et al. |
| 8,977,625 | B2 | 3/2015 | Buehrer et al. |
| 9,031,901 | B1 | 5/2015 | King et al. |
| 2006/0136467 | A1 | 6/2006 | Avinash et al. |
| 2009/0228233 | A1 | 9/2009 | Anderson et al. |
| 2010/0306249 | A1 | 12/2010 | Hill et al. |
| 2011/0161333 | A1 | 6/2011 | Langseth et al. |
| 2013/0159351 | A1 | 6/2013 | Hamann et al. |
| 2014/0032617 | A1 | 1/2014 | Stanfill |
| 2014/0344718 | A1 | 11/2014 | Rapaport et al. |
| 2014/0358932 | A1 | 12/2014 | Brown et al. |
| 2015/0074043 | A1 | 3/2015 | Amir et al. |
| 2015/0169588 | A1 | 6/2015 | Jones et al. |

OTHER PUBLICATIONS

Response to Office Action, dated Dec. 11, 2017, for U.S. Appl. No. 14/853,823, filed Sep. 14, 2015, invented by Prasad M. Deshpande et al., Total 7 pages.

A. Bilke et al., "Schema Matching Using Duplicates" dated 2005, Computer Society, Proceedings of the 21st International Conference on Data Engineering, Total 12 pages.

N. Choi et al., "Survey on Ontology Mapping" dated Sep. 2006, SIGMOD Record, vol. 35, No. 3, Total 8 pages.

E. Rahm et al., "A Survey of Approaches to Automatic Schema Matching" dated Nov. 21, 2001, The VLDB Journal, vol. 10, Total 17 pages.

IBM, "Converting XML to Relational Data", dated 2010, DB2 pureXML Cookbook, Total 23 pages.

Hassanzadeh et al., "Discovering Linkage Points Over Web Data", dated 2010, Proceedings of the VLDB Endowment, vol. 6, No. 6, Total 12 pages.

Hassanzadeh et al., "Helix: Online Enterprise Data Analytics", dated Mar. 28-Apr. 1, 2011, WWW 2011—Demo, Total 4 pages.

"Introduction to Annotated XML Schema Decomposition Using the DB2 Visual Studio 2005 Add-in", dated Nov. 9, 2006, (online), retrieved from the Internet at [URL http://www.ibm.com/developerworks/data/library/techarticle/dm-0611farahbod/] Total 8 pages.

Mell, P. and T. Grange, "Effectively and Securely Using the Cloud Computing Paradigm", [online], Oct. 7, 2009, Total 80 pages.

Mell, P. and T. Grange, "The Nist Definition of Cloud Computing (Draft)", Sep. 2011, Computer Security Division Information Technology Laboratory National Institute of Standards and Technology, Total 7 pages.

Zhang et al., "On MultiColumn Foreign Key Discovery", dated 2010, Proceedings of the VLDB Endowment, vol. 3, No. 1, Total 10 pages.

Abdullah et al.; "The Mapping Process of Unstructured Data to Structured Data", 3rd International Conference on Research and Innovation in Information Systems (ICRIIS '13), 2013 IEEE, Nov. 27-28, 2013, Total 5 pages.

Mohan et al.; "Domain Specific Modeling of Business Processes and Entity Mapping Using Generic Modeling Environment (GME)", Third 2008 International Conference on Convergence and Hybrid Information Technology, 2008 IEEE, vol. 1, Nov. 11-13, 2008, Total 6 pages.

Yang et al.; "The Mapping From Entity Data Model to Relational Data Model", International Conference on Internet Technology and Applications, 2010 IEEE, Aug. 20-22, 2010, Total 5 pages.

US Patent Application, dated Sep. 14, 2015, for U.S. Appl. No. 14/853,823, filed Sep. 14, 2015, invented by Prasad M. Deshpande et al., Total 56 pages.

List of Patents or Patent Applications Treated as Related, dated Sep. 16, 2016, Total 2 pages.

Prelim Amend for 54.131 dated Sep. 19, 2016, or U.S. Appl. No. 14/853,823, filed Sep. 14, 2015, invented by Prasad M. Deshpande et al., Total 5 pages.

Notice of Allowance, dated Mar. 13, 2018, for U.S. Appl. No. 14/853,823, filed Sep. 14, 2015, invented by Prasad M. Deshpande et al., Total 8 pages.

| | 520 |
|---|---|
| 13 | $e_{11}\#\#Age$ |
| 14 | $e_{12}\#\#Age$ |
| 15 | $e_{13}\#\#Age$ |
| Albany | $e_{11}\#\#City$ |
| Buffalo | $e_{12}\#\#City$ |
| David | $e_{13}\#\#Name$ |
| Dec 5 | $e_{13}\#\#DOB$ |
| Hudson | $e_{13}\#\#City$ |
| May 9 | $e_{11}\#\#DOB$ |
| NY | $e_{11}\#\#State, e_{12}\#\#State, e_{13}\#\#State$ |
| Nov 14 | $e_{12}\#\#DOB$ |
| Rob | $e_{11}\#\#Name$ |
| Tom | $e_{12}\#\#Name$ |

| | 530 |
|---|---|
| 13 | $e_{21}\#\#Age$ |
| 14 | $e_{22}\#\#Age$ |
| 15 | $e_{23}\#\#Age$ |
| A | $e_{21}\#\#Grade$ |
| B | $e_{22}\#\#Grade, e_{23}\#\#Grade$ |
| Biology | $e_{22}\#\#Subject$ |
| David | $e_{21}\#\#SName, e_{23}\#\#SName$ |
| Dec 5 | $e_{21}\#\#TestDate, e_{23}\#\#TestDate$ |
| Dec 10 | $e_{22}\#\#TestDate$ |
| Math | $e_{21}\#\#Subject, e_{23}\#\#Subject$ |
| Tom | $e_{22}\#\#SName$ |

$e_{11}\#\#Age, e_{23}\#\#Age$
$e_{12}\#\#Age, e_{22}\#\#Age$
$e_{13}\#\#Age, e_{21}\#\#Age$
$e_{13}\#\#Name, e_{21}\#\#SName$
$e_{13}\#\#Name, e_{23}\#\#SName$
$e_{13}\#\#DOB, e_{21}\#\#TestDate$
$e_{13}\#\#DOB, e_{22}\#\#TestDate$
$e_{12}\#\#Name, e_{22}\#\#SName$

$e_{11}\#e_{23}$    Age#Age
$e_{12}\#e_{22}$    Age#Age, Name#SName
$e_{13}\#e_{21}$    Age#Age, Name#SName, DOB#TestDate
$e_{13}\#e_{23}$    Name#SName
$e_{13}\#e_{22}$    DOB#TestDate

| | |
|---|---|
| Age#Age | $e_{11}\#e_{23}, e_{12}\#e_{22}, e_{13}\#e_{21}$    3 |
| Age#Age, Name#SName | $e_{12}\#e_{22}, e_{13}\#e_{21}$    2 |
| Age#Age, Name#SName, DOB#TestDate | $e_{13}\#e_{21}$    1 |
| Name#SName | $e_{13}\#e_{23}, e_{12}\#e_{22}, e_{13}\#e_{21}, e_{13}\#e_{21}$    4 |
| DOB#TestDate | $e_{13}\#e_{22}, e_{13}\#e_{21}$    2 |

| School | Principal | Program Type | ISMATCH |
|---|---|---|---|
| Name1 | John Smith | Elementary | 0 |
| Name2 | John Schmit | High School | 1 |
| Name3 | Jane Doe | High School | 1 |
| Name4 | Jane Smith | Middle School | 0 |
| Name1 | John Smith | High School | 0 |

710

| School | Principal | City | State | Scores |
|---|---|---|---|---|
| Name1 | John Smith | City1 | S1 | 10 |
| Name2 | John Schmit | City1 | S1 | 10 |
| Name3 | Jane Doe | City1 | S1 | 11 |
| Name3 | Jane Doe | City3 | S2 | 21 |
| Name2 | John Schmit | City3 | S2 | 11 |

FIG. 7

IDENTIFYING ENTITY MAPPINGS ACROSS DATA ASSETS

FIELD

Embodiments of the invention relate to identifying entity mappings across data assets.

BACKGROUND

Big data refers to very large data sets. In big data paradigms, there may be a need to integrate various data assets. The data assets may be structured, semi-structured, or unstructured. A structured data asset may be described as a set of attributes and corresponding values. This integration may be done using join, merge or union operations. The data sets may be stored in tables having rows and columns ("attributes") in a Relational Database Management System (RDBMS). For performing these operations across data assets, entity mappings between them need to be obtained. The entity mappings describe the column values that should be compared to know whether the same real-world entity is described in the two data assets. Currently, such column mapping is done manually, which is not suitable for data discovery in big data paradigms.

Some systems identify foreign keys in relational tables. The primary key (PK) to foreign key (FK) relationship may involve a single column or multiple columns. These systems assume that at-least one key is a primary key and that the relationship has to be one-to-one (e.g., 100%) (i.e., each foreign key should be a primary key of the other data asset).

Some systems estimate individual column mappings using semantic similarities. However, these systems are not based on joins between the two datasets.

Some systems identify attribute pairs that may be used to link two tables, but such systems discover only single attribute mappings.

SUMMARY

Provided is a method for identifying entity mappings across data assets. The method comprises generating entity mappings that produce matching entities for a first data asset having attributes and a second data asset having attributes by: generating entity mappings that produce matching entities for a first data asset having attributes with attribute values and a second data asset having attributes with attribute values by: matching the attribute values of the attributes of the first data asset with the attribute values of the attributes of the second data asset, using the matching attribute values to generate matching attribute pairs, and using the matching attribute pairs to identify entity mappings; computing an entity mapping score for each of the entity mappings based on a combination of factors; ranking the entity mappings based on each entity mapping score; and using the ranked entity mappings to determine which of the entity mappings are to be used to determine whether a same real-world entity is described by the first data asset and the second data asset.

Provided is a computer program product for identifying entity mappings across data assets. The computer program product comprises a computer readable storage medium having program code embodied therewith, the program code executable by at least one processor to perform: generating entity mappings that produce matching entities for a first data asset having attributes and a second data asset having attributes by: generating entity mappings that produce matching entities for a first data asset having attributes with attribute values and a second data asset having attributes with attribute values by: matching the attribute values of the attributes of the first data asset with the attribute values of the attributes of the second data asset, using the matching attribute values to generate matching attribute pairs, and using the matching attribute pairs to identify entity mappings; computing an entity mapping score for each of the entity mappings based on a combination of factors; ranking the entity mappings based on each entity mapping score; and using the ranked entity mappings to determine which of the entity mappings are to be used to determine whether a same real-world entity is described by the first data asset and the second data asset.

Provided is a computer system for identifying entity mappings across data assets. The computer system comprises: one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform: generating entity mappings that produce matching entities for a first data asset having attributes and a second data asset having attributes by: generating entity mappings that produce matching entities for a first data asset having attributes with attribute values and a second data asset having attributes with attribute values by: matching the attribute values of the attributes of the first data asset with the attribute values of the attributes of the second data asset, using the matching attribute values to generate matching attribute pairs, and using the matching attribute pairs to identify entity mappings; computing an entity mapping score for each of the entity mappings based on a combination of factors; ranking the entity mappings based on each entity mapping score; and using the ranked entity mappings to determine which of the entity mappings are to be used to determine whether a same real-world entity is described by the first data asset and the second data asset.

Embodiments advantageously generate a first inverted index of entity identifier pairs for the first data asset; generate a second inverted index of entity identifier pairs for the second data asset; and use the first inverted index and the second inverted index to generate the matching attribute pairs based on matching attribute values that form the entity mappings.

Embodiments do not assume that at least one key is a primary key and that the relationship between foreign key and primary key between data assets is one-to-one. Moreover, unlike some prior art systems, embodiments advantageously discover multiple attribute mappings.

Moreover, embodiments allow for matching values fuzzily for the matching entities. This advantageously avoids a need for exact matching.

Also, embodiments compute the entity mapping score for each of the entity mappings by generating an entity mapping score for factors selected from: a number of attributes involved in an entity mapping, a cardinality of that individual entity mapping, support of that entity mapping, a probability of one to one matching for that entity mapping, a join utility measure for that entity mapping, and a probability of previous user selections for that entity mapping, and adding the entity mapping score for each of the factors to generate the entity mapping score for that entity mapping. Thus, embodiments advantageously take many factors into consideration.

In addition, embodiments allow for one of the first data asset and the second data asset to be semi-structured data having hierarchical data that is flattened. Embodiments also allow for one of the first data asset and the second data asset to be an unstructured data asset formed by a collection of documents and is modelled based one of a bag of words and annotated words. Thus, embodiments advantageously allow for data assets to be structured, semi-structured, and/or unstructured.

Furthermore, embodiments integrate the first data asset and the second data asset using ranked entity mappings by performing one of a join operation, a merge operation, and a union operation. That is, unlike some prior art systems, embodiments advantageously use join, merge, and union operations.

BRIEF DESCRIPTION OF THE SEVERAL VIEWS OF THE DRAWINGS

Referring now to the drawings in which like reference numbers represent corresponding parts throughout:

FIGS. 5A, 5B, 5C, 5D, and 5E illustrate an example of operations of FIG. 4 in accordance with certain embodiments.

FIG. 7 illustrates tables of entity mapping scores in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
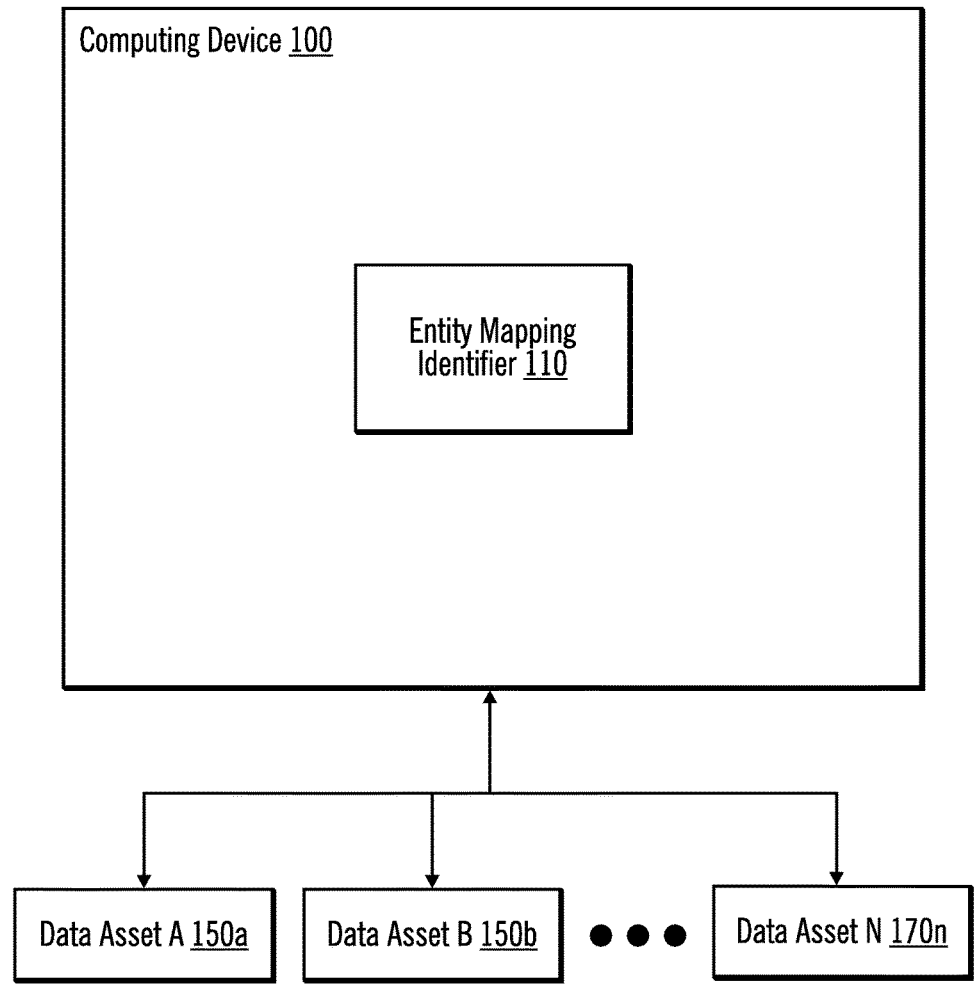
FIG. 1 illustrates, in a block diagram, a computing environment in accordance with certain embodiments.

FIG. 1 illustrates, in a block diagram, a computing environment in accordance with certain embodiments. In FIG. 1, a computing device 100 is coupled to data asset A 150a, data asset b 150b, . . . and data asset N 150n. The ellipses are used to indicate that any number of data assets may be coupled to the computing device 100. The data assets 150a . . . 150n may store big data. The computing device 100 includes an entity mapping identifier 110. The entity mapping identifier 110 discovers entity mappings between data assets. The entity mapping identifier 110 covers different data types and provides ranking for entity mappings.

Linking of multiple disparate data assets may be advantageously used for: identifying related data assets, provisioning of data for analytics, enriching data assets, and entity resolution. The data assets may be integrated using operations, such as join, merge or union. The entity mapping identifier 110 obtains entity mappings (also referred to as schema mappings) that are used for integrating the data assets.

An entity mapping may be described as a set of attributes that define a real-world object. A real-world object may be, for example, a person, a building, a location, a car, etc. That is, an entity mapping for a data asset A with columns a1, a2, . . . an, with regard to data asset B with columns b1, b2, . . . bm is a set of column mappings $\{a_i{:}b_j | a_i \subset (a1, a2, \ldots an), b_j \subset c (b1, b2, \ldots bm)\}$ and matches at least λ rows of A. With embodiments, the entity mapping is directional since the number of matching rows of A to B may be different from the number of matching rows of B to A. Entity resolution may be described as a process used to find whether two sets of attributes are describing the same real-world object. To know whether two data assets are related, entity resolution finds whether two data assets are describing the same or similar sets of real-world objects. For example, a data asset A entity may be represented by its attributes $\{a1, a2, a3, \ldots, an\}$, while a data asset B entity may be represented by its attributes $\{b1, b2, b3, \ldots, bm\}$. An entity mapping between two data assets A $\{a1, a2, a3, \ldots, an\}$ and B $\{b1, b2, b3, \ldots, bm\}$ may be represented as:

$$\{(a_i{:}b_j | a_i \in A, b_j \in B)\}$$

Entity mapping is identified between various types of data assets: structured to structured, structured to semi-structured, semi-structured to structured, semi-structured to semi-structured, unstructured to structured, and unstructured to semi-structured.

Figure 2:
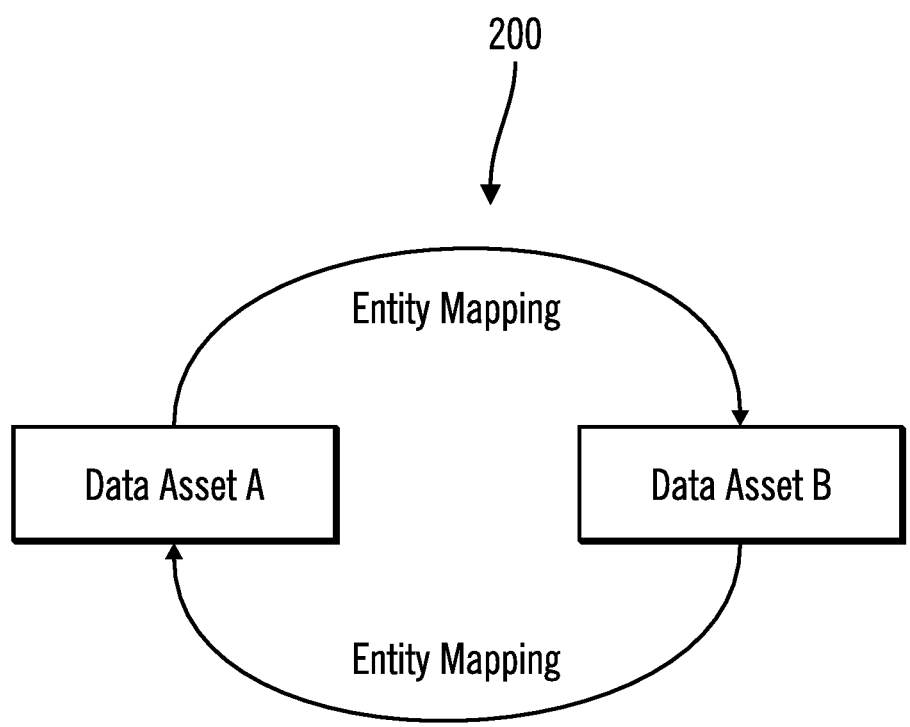
FIG. 2 illustrates entity mapping between data assets in accordance with certain embodiments.

FIG. 2 illustrates entity mapping between data assets in accordance with certain embodiments. In particular, FIG. 2 illustrates that entity mapping may be a directional relationship between two data assets, data asset A and data asset B. A directional relationship implies that a first data asset may be related to a second data asset, but the second data asset may not be related to the first data asset.

Figure 3:
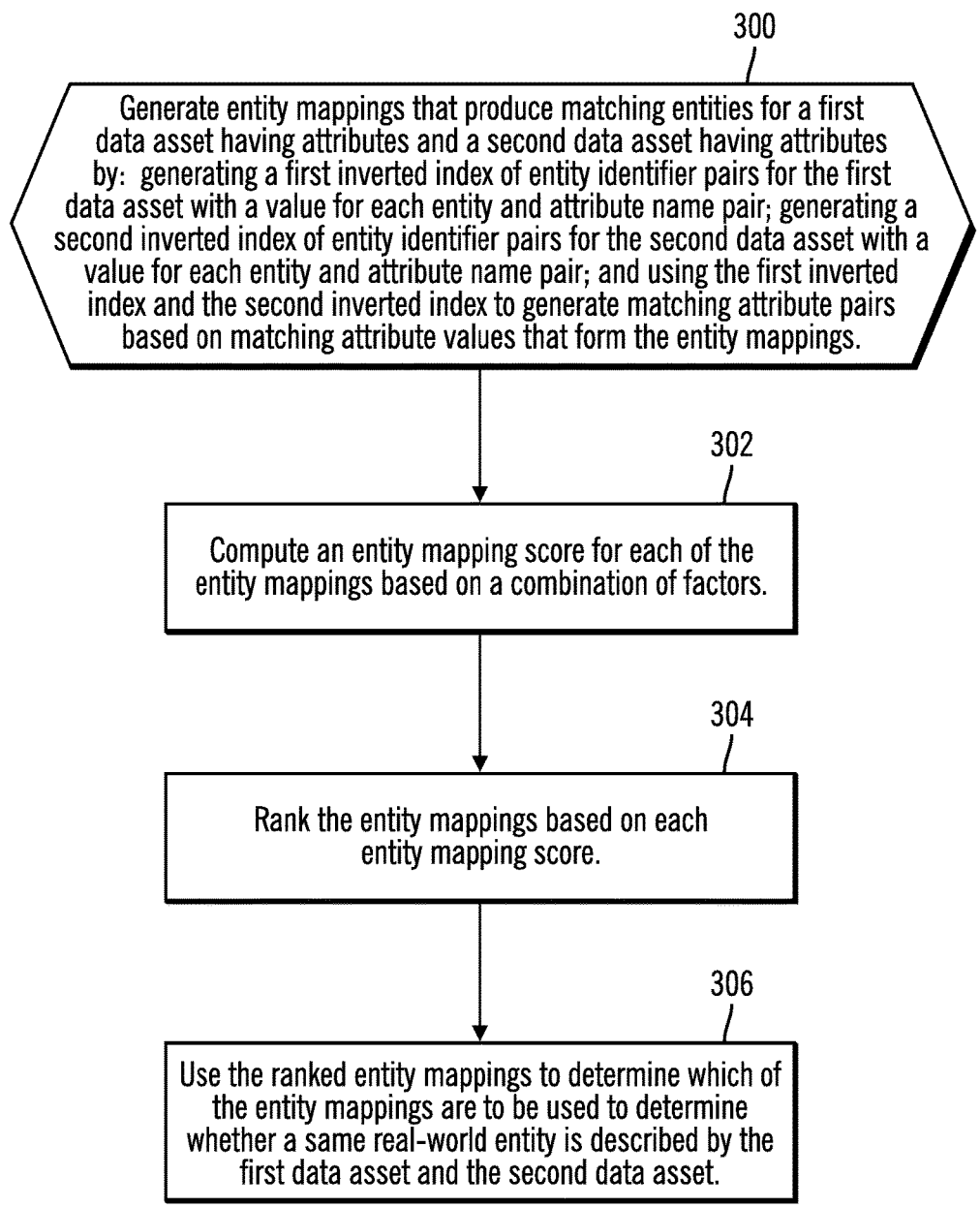
FIG. 3 illustrates, in a flowchart, operations to generate ranked entity mappings in accordance with certain embodiments.

FIG. 3 illustrates, in a flowchart, operations to generate ranked entity mappings in accordance with certain embodiments. Control begins at block 300 with the entity mapping identifier 110 generating entity mappings that produce matching entities for a first data asset having attributes and a second data asset having attributes by: generating a first inverted index of entity identifier pairs for the first data asset with a value for each entity and attribute name pair; generating a second inverted index of entity identifier pairs for the second data asset with a value for each entity and attribute name pair; and using the first inverted index and the second inverted index to generate matching attribute pairs (which may be referred to as matching entity pairs) based on matching attribute values that form the entity mappings. In block 302, the entity mapping identifier 110 computes an entity mapping score for each of the entity mappings based on a combination of factors. In block 304, the entity mapping identifier 110 ranks (and optionally filters) the entity mappings based on each entity mapping score. In block 306, the entity mapping identifier 110 uses the ranked entity mappings to determine which of the entity mappings are to be used to determine whether a same real-world entity is described by the first data asset and the second data asset.

In certain embodiments, depending on the entity mapping score, the entity mapping identifier 110 may filter out entity mappings having entity mapping scores less than a certain threshold and may rank the remaining entity mappings using the associated entity mapping scores.

Figure 4:
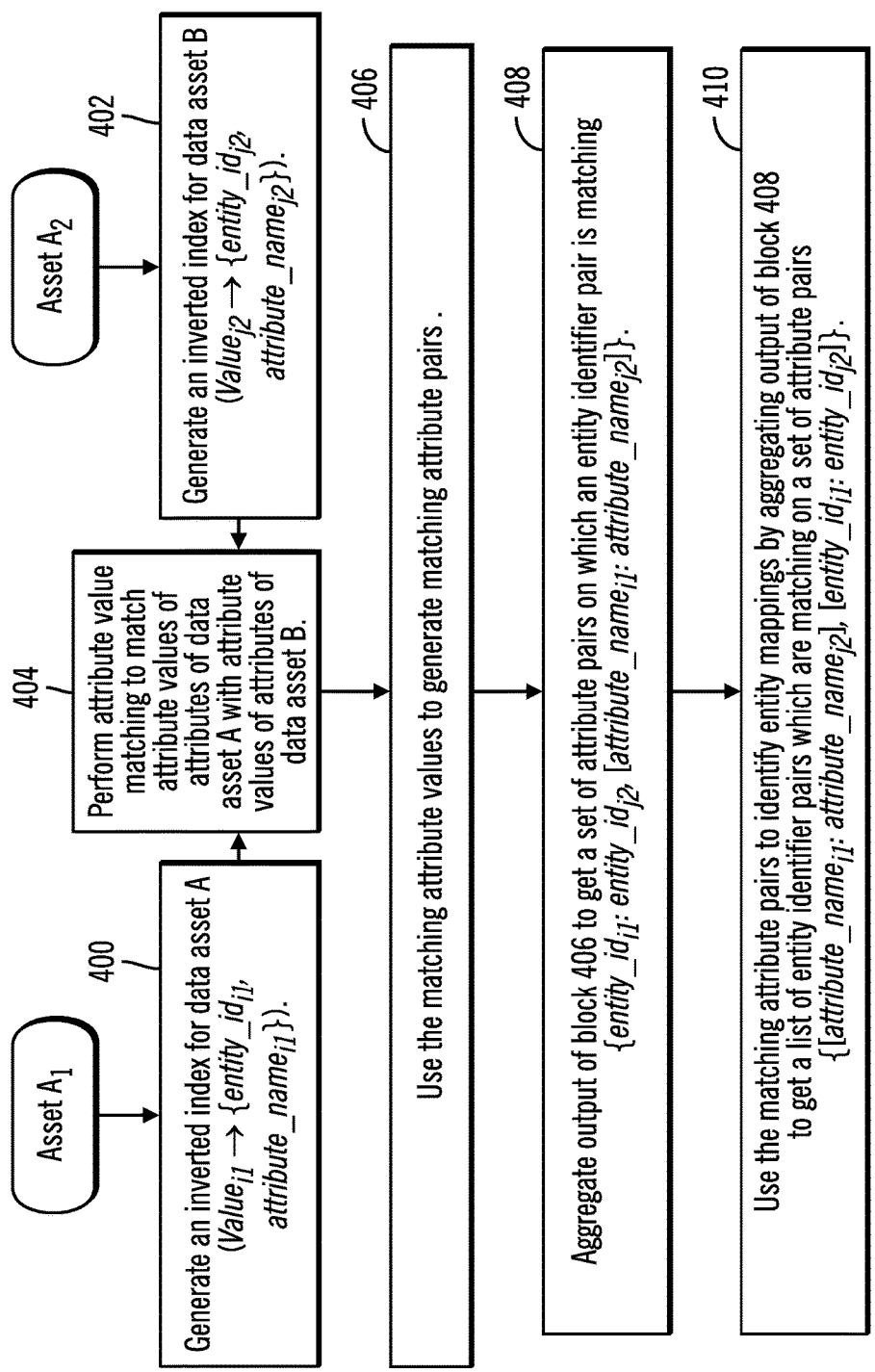
FIG. 4 illustrates, in a flowchart, operations to generate entity mappings and entity mapping scores in accordance with certain embodiments.

FIG. 4 illustrates, in a flowchart, operations to generate the entity mappings and entity mapping scores in accordance with certain embodiments. The operations of FIG. 4 give possible entity mappings along with their matching attribute pairs.

Figure 5A:
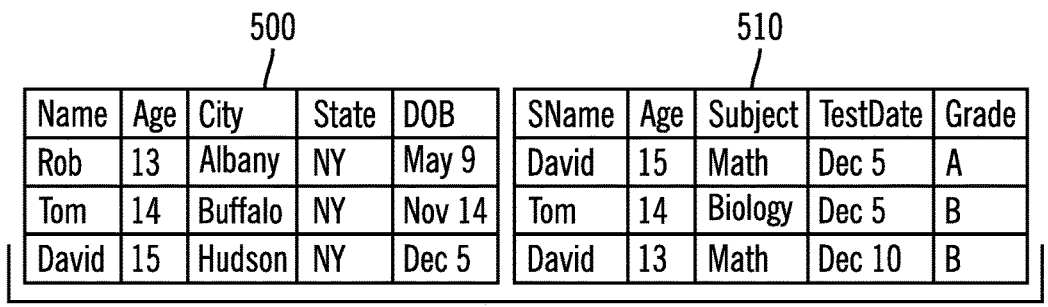

In FIG. 4, control begins in block 400 with the entity mapping identifier 110 generating an inverted index for data asset A (a first data asset) (Value$_{i1}$→{entity_id$_{i1}$, attribute_name$_{i1}$}) and in block 402 with the entity mapping identifier 110 generating an inverted index for data asset B (a second data asset) (Value$_{j2}$→{entity_id$_{j2}$, attribute_name$_{j2}$}). An inverted index for a particular entity or database row represented by an entity identifier (entity_id$_i$) has a value Value$_i$ for an attribute having an attribute_name$_i$. Merely to enhance understanding, FIGS. 5A, 5B, 5C, 5D, and 5E illustrate an example of the operations of FIG. 4 in accordance with certain embodiments. In FIG. 5A, data asset A 500 and data asset B 510 are illustrated. FIG. 5B illustrates an inverted index 520 for data asset A 500, and an inverted index for data asset B 530. In FIG. 5B, e11, e12, etc. are in different rows for data asset A 500, and e21, e22, etc. are in different rows for data asset B 530.

In block 404, the entity mapping identifier 110 performs attribute value matching to match attribute values of attributes of data asset A with attribute values of attributes of data asset B (e.g., attribute Name from data asset A 500 matches attribute SName of data asset B 510).

In block 406, the entity mapping identifier 110 uses the matching attribute values to generate matching attribute pairs. In particular, in block 406, the entity mapping identifier 110 obtains a list of tuples, with each tuple including an entity identifier from data asset A, an attribute name from data asset A, an entity identifier from data asset B, and an attribute name from data asset B ({entity_id$_{i1}$, attribute_name$_{i1}$, entity_id$_{j2}$, attribute_name$_{j2}$}) if their corresponding values are matching. FIG. 5C illustrate example output 540 for the processing of block 406.

In block 408, the entity mapping identifier 110 aggregates the output of block 406 to get the set of attribute pairs on which an entity identifier pair is matching {entity_id$_{i1}$: entity_id$_{j2}$, [attribute_name$_{i1}$: attribute_name$_{j2}$]}. FIG. 5D illustrates example output 550 for the processing of block 408.

In block 410, the entity mapping identifier 110 uses the matching attribute pairs to identify entity mappings by aggregating the output of block 408, to get the list of entity-id pairs which are matching on a set of attribute pairs to {[attribute_namei1: attribute_namej2], [entity_id$_{i1}$: entity_id$_{j2}$]}. FIG. 5E illustrates example output 560 for the processing of block 410.

The example output 560 also shows the number of entity pairs that are matching based on the set of attribute pairs.

There may be multiple entity mappings (i.e., a set of attribute name pairs as the output of block 410, between a pair of data assets). All these mappings are such that based on each of these mappings a large number (more than certain threshold) of entities from the source data asset (data asset A) have at least one matching entity in the target data asset (data asset B). Determining which of the multiple entity mappings are useful depends on many factors, such as: the result of joining the data assets based on the entity mappings, the percentage of rows that join (support), and the final objective of joining the assets. With embodiments, the entity mapping identifier 110 ranks the entity mappings based on a combination of factors. The entity mappings describe the column values that may be compared to determine whether the same real-world entity is described in the two data assets. Once the entity mappings are ranked, they may be used in the ranked order described in the two data assets.

In an entity matching scenario, each row represents one entity. So the mapping between the two data assets should match one row (A1) in the first data asset (data asset A) with at least one row (B1) in the second data asset (data asset B). In such embodiments, the entity mapping identifier 110 assigns a higher entity mapping score to the entity mapping that causes a 1:1 mapping between the data assets. Both the data assets have a similar type of entities, e.g., both row A1 and row B1 are describing customers. In certain embodiments, for the general scenario of joins between two data assets, the fan out does not matter. That is, each row in the source data asset (A) may match with one or more rows in the target data asset (B). In this case, the entity mapping may be m:n rather than 1:1.

For each entity matching, the entity mapping identifier 110 also considers the number of additional attributes or columns which are not part of the matching. These columns provide value add (utility) when performing join/merge of entities. In cases in which the user knows the entity definition. An entity definition defines attributes of entities of an asset that may be used to identify the real-world entities (whereas entity mapping is across two data assets to know whether two entities are defining the same real-world entity) of one of the data assets (i.e., the list of attributes of one data asset which are part of entity mapping), the entity mapping identifier 110 ranks the entity mappings for that particular entity definition based on their support as follows: rank the mapping with larger support, higher (i.e., entity mappings with more matching rows are ranked higher).

In certain embodiments, the entity mapping identifier 110 maintains a history of user selections and weighs the support by probability of user selections (i.e., if the user has selected a particular entity mapping compared to other entity mappings, that entity mapping is ranked higher).

In certain embodiments, the entity mapping identifier 110 combines different factors, such as: a number of entity mapping attribute pairs, cardinality of entity mapping, join utility, support, probability of 1:1 or M:N mappings (based on scenario), and probability of past user selection, if any.

In certain embodiments, the entity mapping score f is a function of the following factors:
- a number of attributes involved in entity mapping (n)
- a cardinality of individual entity definition (i.e., joint cardinality of a set of attributes used for entity mapping, C1 and C2, for the source and target data asset)
- support of matching (s, a number of entities or rows of the source data asset which are matching with one or more entities or rows of the target data asset)
- a probability of one to one (1:1) matching compared to (M:N) matching (p)
- a join utility (j) that accounts for obviousness of matches across data assets for different attribute cardinalities. A match on an attribute, such as 'Gender', that contains only a few distinct values, will find matching records from other assets, but may not add much value to the overall mapping (e.g., inverse of joint cardinality of attributes from the source data asset). A join utility may be a function of a number of columns besides entity definitions.
- a probability of previous user selections, if any (u, higher for entities which were selected earlier)

The value of the entity mapping score f may be derived as function(1):

$$f = k_1 n + k_2 c_1 c_2 + k_3 \left( \frac{s}{s+\alpha} \right) + k_4 p + k_5 j + k_6 u$$

With reference to the entity mapping score f, the $k_i$'s and $\alpha$ values are positive coefficients giving weights to individual factors. For example, in certain scenarios where one needs to add more and more attributes to the source asset, one should assign lower value to $\alpha$; or when there is enough user history with similar use-cases one can assign higher value to $k_6$. From earlier example of FIGS. 5A-5E, assuming parameters $k_1$=0.1, $k_2$=0.15, $k_3$=0.2, $k_4$=0.1, $k_5$=0.3, and $k_6$=0.15, and values from example embodiment for variables n=1, $C_1$=3, $C_2$=3, s=3, $\alpha$=1, p=1, j=1/3, and u=0, a mapping score f for mapping Age#Age would evaluate to:

$$f=0.1*1+0.15*3*3+0.2*3/4+0.1*1+0.3*1/3=1.8$$

In certain embodiments, a user may be presented the entity mapping results with descending values of the entity mapping score f.

Thus, computing the entity mapping score for each of the entity mappings includes generating an entity mapping score using one or more of: a number of attributes involved in an entity mapping of the entity mappings, a cardinality of that individual entity mapping, support of matching for that entity mapping, a probability of (1:1) matching for that entity mapping, a join utility for that entity mapping, and a probability of previous user selections for that entity mapping, and adding the entity mapping score for each element to generate the entity mapping score for that entity mapping.

Certain embodiments are advantageously directed to semi-structured data assets (e.g., eXtensible Markup Language (XML) and JavaScript Object Notation (JSON)). JavaScript is a registered trademark of Oracle Corporation in the United States and/or other countries.

In comparison to structured data assets, the entity mapping identifier 110 handles the following additional features for semi-structured data assets:
- each record (row) may be hierarchical
- each record may have different schema—with optional attributes.
- attributes may have multiple values (e.g., an array structure for JSON)

For semi-structured data assets, embodiments provide techniques of handling arrays and optional attributes as follows:

1) Flatten the hierarchical structures of these documents to handle the hierarchy. Optional attributes are converted into attributes that can store null values, as well. For example, phone_number: {cell: +1-234-567890, landline: +1-987-6543210} may be flattened as entity with two attributes phone_number.cell=+1-234-567890 and phone_number. Landline=+1-987-6543210.

2) Arrays may be handled by defining different equality operations for arrays. For example, embodiments may define two arrays to be equal if they have at least one value in common.

The entity mapping identifier 110 may employ a similar technique for semi-structured nested data as for structured data assets with some modifications. In certain embodiments, hierarchical schema for semi-structured data may be handled by flattening the data with hierarchical column names.

With embodiments, each record in semi-structured data may have a different schema. Thus, instead of having 1:1 attribute mappings, there may be 1 to many and/or many to 1 mappings. For example, an attribute phone number may have to be matched with a cell number, as well as, a home phone number. The entity mapping identifier 110 may also handle this by having a comprehensive entity mapping with support penalty for absent attributes while having 1:M (or M:1) mapping for some attributes ($\{(a_i:b_j | a_i \in A, b_j \in B)\}$ with partial matching). For handling array attributes, the entity mapping identifier 110 may change the attribute value matching to include operators such as: in, subset, etc.

Certain embodiments advantageously apply to unstructured data assets. In certain embodiments, an unstructured data asset may be considered as a collection of documents. An entity definition for an unstructured data asset may be established with respect to another structured or semi-structured data asset. Any unstructured document may be modeled in two ways: 1) bag of words or 2) annotated words.

In the bag of words case, there may be one sides mapping, i.e., a list of columns/paths from other (structured/semi-structured) data asset that should match the words from the unstructured data assets.

In case of annotated documents, the unstructured data assets may be represented as structured/semi-structured data assets, and the techniques for structured and semi-structured data assets are applied. For example a sentence, "Mr. Wilson went to Chicago on May 14", may be annotated as "Mr. Wilson <person-name> went to Chicago <city> on May 14<date>". This can be constructed as entity with three attributes person-name, city, and date with associated values.

With embodiments, a user may be given choices for joining multiple data assets associated with a score. With embodiments, an entity mapping score is defined as a combination of multiple factors discussed above with reference to function (1). Once the data assets are joined, various operations may be performed to characterize the matching rows, e.g., defining relationship contexts between data assets.

Embodiments extract entity mappings that produce matching entities between a pair of data assets. Embodiments compute a strength of the entity mapping that produces matching entities between a pair of data assets.

Embodiments extract entity mappings that produce matching entities between a pair of data assets where values may match fuzzily. Here fuzzy matching may be described as matching two values approximately. For example, if two values are "International" and "Internatonal", then these are not exact matches, but they may be said to be fuzzily matching, allowing, for example, some spelling mistakes.

Merely to enhance understanding of embodiments, some examples will be provided. However, embodiments are not limited to such examples.

In use case 1, a user may want to add to the factual information of the matching rows in data asset A from another data asset B. The user may choose an entity mapping (provided by the entity mapping identifier 110) that minimizes duplicate sets of matching values. This biases towards an entity mapping with columns having more unique values. This closely resembles 1:1 matching. This works for data assets that host similar entity types e.g. both A and B both talk about a person. Vertically partitioned data (where an entity's attributes are partitioned and kept as different data assets) may also be merged in this process.

In use case 2, the user may want to integrate generalizations of a set of values (e.g. given street/city, the user wants to add state/zipcode) against each matching row. This biases towards choosing an entity definition with more duplicate values and a fewer number of columns. This closely resembles M:1 matching. This works for data assets which need not be similar. In use case 3, the user may want to keep the information that results in a high number of matching rows. This biases towards choosing an entity definition with very high support. This closely resembles M:N matching. This helps in integrating data which are horizontally partitioned.

With reference to computing probabilities of entity mappings, embodiments may want to compute the joint distribution arising from each entity definition identified for source data asset A. Consider the entity definition of concern is $e_1$, which results in rows $r_1, r_2, \ldots r_n$ of A to match against rows $s_1, s_2, \ldots s_k$ of target data asset B. The joint distribution $\theta_{e1}(A,B)$ in this case may be calculated using following formula (1):

$Pr(r_1, r_2, \ldots r_n : s_1, s_2, \ldots, s_k)$ [Given that $n$ rows from $A$ matched $k$ rows from $B$]

$Pr(r_1, r_2, \ldots, r_n | s_1, s_2, \ldots, s_k) Pr(s_1, s_2, \ldots, s_k)$

Using a Naïve Bayes assumption of conditional independence, the above formula may be rewritten as formula (2):

$Pr(r_1 | s_1, s_2, \ldots, s_k) Pr(r_2 | s_1, s_2, \ldots, s_k)$
$Pr(r_n | s_1, s_2, \ldots, s_k) Pr(s_1, s_2, \ldots, s_k)$ Fraction of rows $r_1$ matched with in the set $s_1$, $s_2, \ldots, s_k) \ldots$ (Fraction of rows $r_n$ matched with in the set $s_1, s_2, \ldots, s_k) \times (k/|B|)$ $S_{e1}(s_1, s_2, \ldots, s_k)$=the support of $e1$ with respect to data asset $B$ Note that this value of $\theta_{e1}(A,B)$ reflects whether the join is close to 1:[1 or N] (higher value) or M:[1 or N] (lower value) from A's side.

For the three use cases discussed above, the entity mapping identifier 110 opts for three scores to rank entity definitions against each of the use cases. Using formula (2), the entity mapping identifier 110 calculates the joint distribution $\theta_{e1}(A,B) = Pr_{e1}(r_1 | s_1, s_2, \ldots, s_k) Pr_{e1}(r_2 | s_1, s_2, \ldots, s_k) \ldots Pr_{e1}(r_n | s_1, s_2, \ldots, s_k) Pr_{e1}(s_1, s_2, \ldots, s_k)$ Similarly, the reverse relation from asset B to asset A is calculated as $\theta_{e1}(B,A)$ The strength of an entity definition e1 is defined in terms of $F_\beta$ score with formal (3):

$$F_{\beta(e1,A)} = (1 + \beta(e1, A)^2) \frac{\theta_{e1}(A, B) * \theta_{e1}(B, A)}{\beta(e1, A)^2 \theta_{e1}(A, B) + \theta_{e1}(B, A)}$$

With use case 1: with $\beta(e1,A)<1$, the score increases with the entity definition containing unique values on both A, B (i.e. 1:1 case), so the entity mapping identifier 110 chooses $\beta(e1,A)=S_{e1}(A)$.

With use case 2: with $\beta(e1,A)>=1$, the score increases with the entity definition containing unique values on B (i.e., m:1 case), so the entity mapping identifier 110 chooses $\beta(e1,A)=1+S_{e1}(A)$.

Ranking for use case 3 is $S_{e1}(A) \times S_{e1}(B)$.

Figure 6:
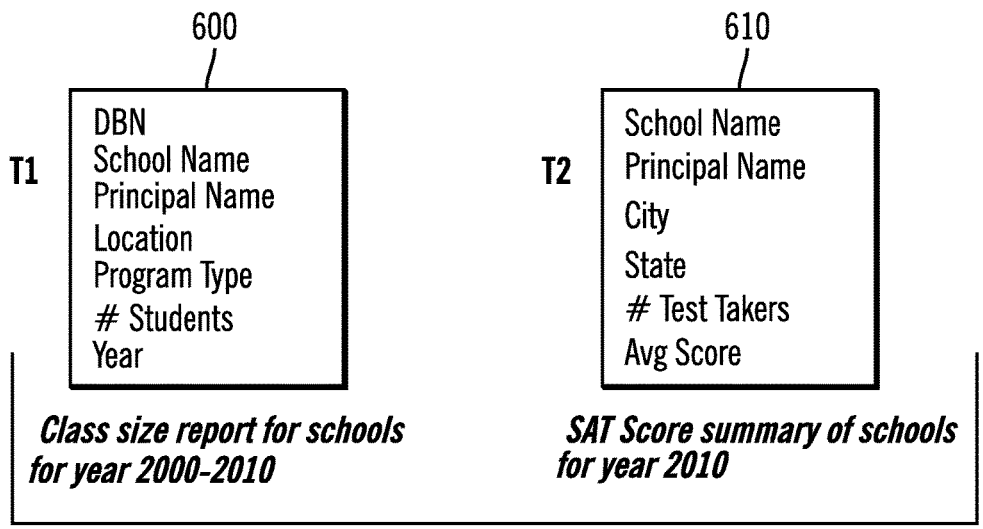
FIG. 6 illustrates table T1 and table T2 in accordance with certain embodiments.

FIG. 6 illustrates table T1 600 and table T2 610 in accordance with certain embodiments. With table T1 600 and table T2 610, there is no PK-FK mapping, and the

--- potential set of joinable columns are:
    T1(School Name) <-> T2(School Name)
    T1(Principal Name) <-> T2(Principal Name)
    T1(Location) <-> T2(City)
    ...
    T1(School Name, Principal Name, Location) <-> T2(School Name, Principal Name, City) {all 6 combinations}

---

With table T1 600 and table T2 610, The spurious matches are: #Students:#TestTakers. The match may be described as spurious because it holds only on a syntactical level (i.e., matching on values), but not on a semantical level (i.e., matching two tables on #Students against #TestTakers does not have practical significance, unlike matching on School Name or Location).

FIG. 7 illustrates tables of entity mapping scores 700, 710 in accordance with certain embodiments. For entity definition T1(School Name, Principal Name, Location)<->T2 (School Name, Principal Name, City), the corresponding strength is computed:

$\theta(A,B)=(\frac{1}{2}*\frac{1}{2})*1=0.5$ $\theta(B,A)=(1*1)=1$ $\beta(e1,A)=1, \beta(e1,B)=0.5$ $F_{\beta(e1,A)}=2*(0.5/1.5)=0.6$ $F_{\beta(e1,B)}=1.25*(0.5/0.75)=0.83$ Therefore, m:1 gets more strength. Assume that addition of location removes the redundancy from the B side, leading to a perfect match. Then, the score is computed as follows:

$F_{\beta(e1,A)}=2*(\frac{1}{2})=1$

Therefore, 1:1 gets even more strength than m:1.

Figure 8:
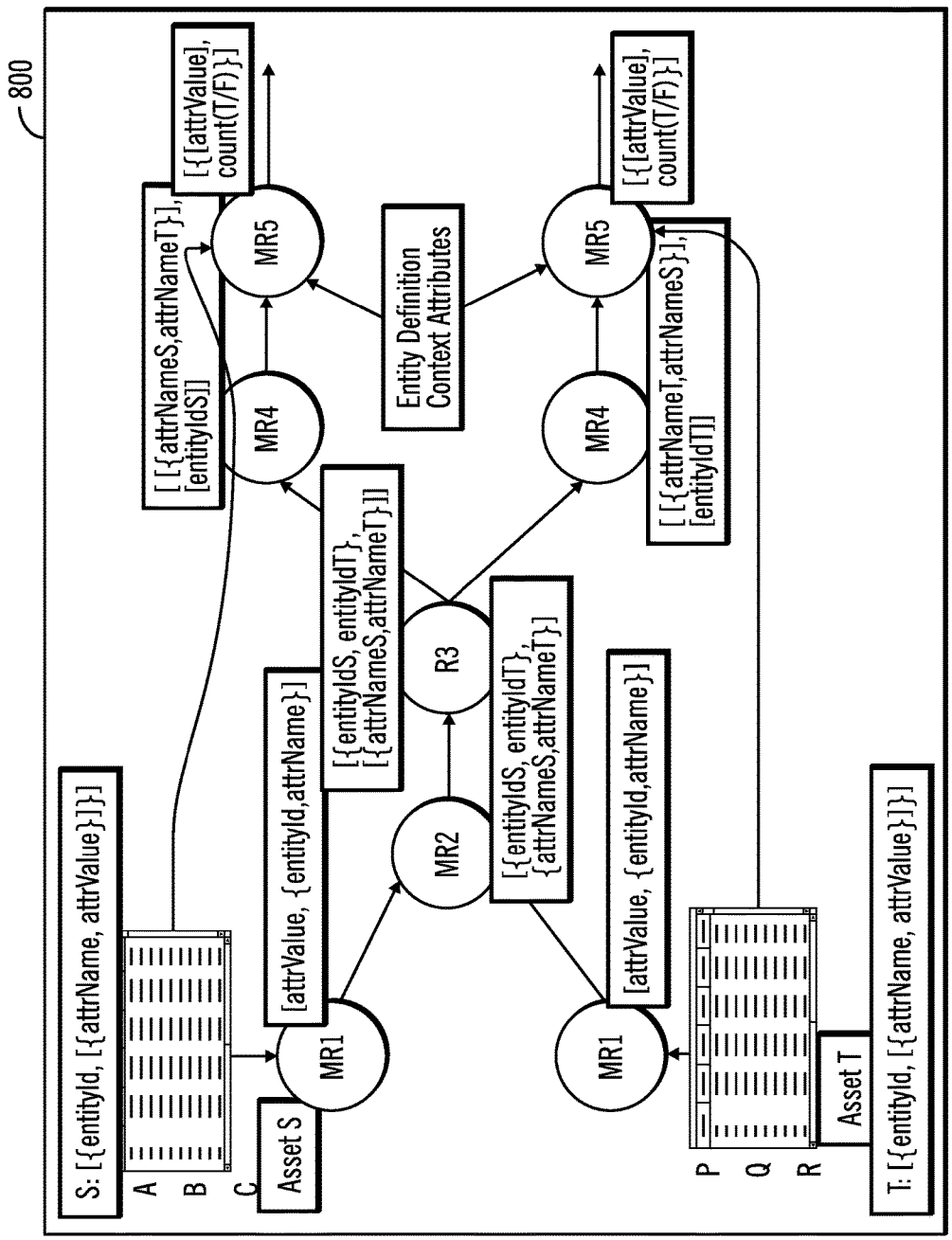
FIG. 8 illustrates an example implementation in accordance with certain embodiments.

FIG. 8 illustrates an example implementation 800 in accordance with certain embodiments.

Given input data assets S and T, both having a set of records with entityId as the key, and one or more fields represented using {attrName, attrValue}, at the first block denoted MR1, the entity mapping identifier 110 builds a reverse index with attrValue as the key, and one or more pairs of {entityId, attrName}.

Reverse indices from both these data assets are fed to block MR2, at which the entity mapping identifier 110 combines all pairs of {entityId, attrName} from both the data assets with matching attrValue and outputs a set of {entityIdS:entityIdT} against corresponding {attrNameS: attrNameT}, where entityIdS is a specific entityId from S, entityIdT is a specific Id (identifier) from T, attrNameS is a specific field from S under entity identifier entityIdS, attrNameT is a specific field from T under entity identifier entityIdT, and attrNameS as well as attrNameT have the same value in the corresponding data assets.

At the next block denoted R3, the entity mapping identifier 110 aggregates all such pairs with same key.

The next step, MR4, is directional in nature, and its outcome depends on whether the direction is from S to T, or from T to S. In the first case, the entity mapping identifier 110 outputs a list of entity identifiers from data asset S, whereas, in the latter case, the entity mapping identifier 110 outputs a list of entity identifiers from data asset T, aggregated against unique combinations of {attrNameS:attrNameT}.

Figure 9:
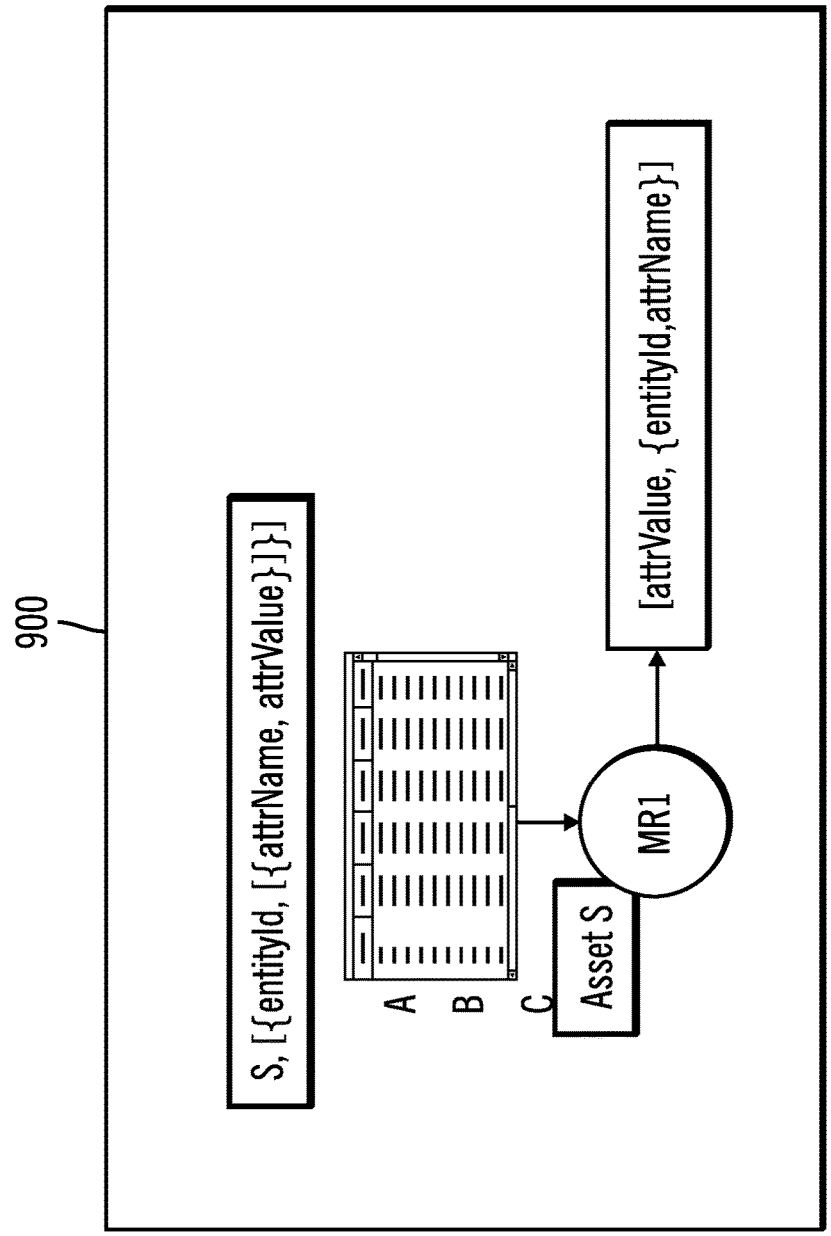
FIG. 9 illustrates processing for creating an inverted index on attribute values of various entity attributes of a data asset in accordance with certain embodiments.

FIG. 9 illustrates processing 800 for creating an inverted index on attribute values of various entity attributes of a data asset S in accordance with certain embodiments. This is also illustrated in FIG. 7.

Given a data asset S with entityId as the key for a record, and a set of fields with their corresponding values, this phase builds a reverse index in which every field value (attrrValue) becomes a key, and the enttyId-attrName under which it was found are aggregated against it.

Figure 10:
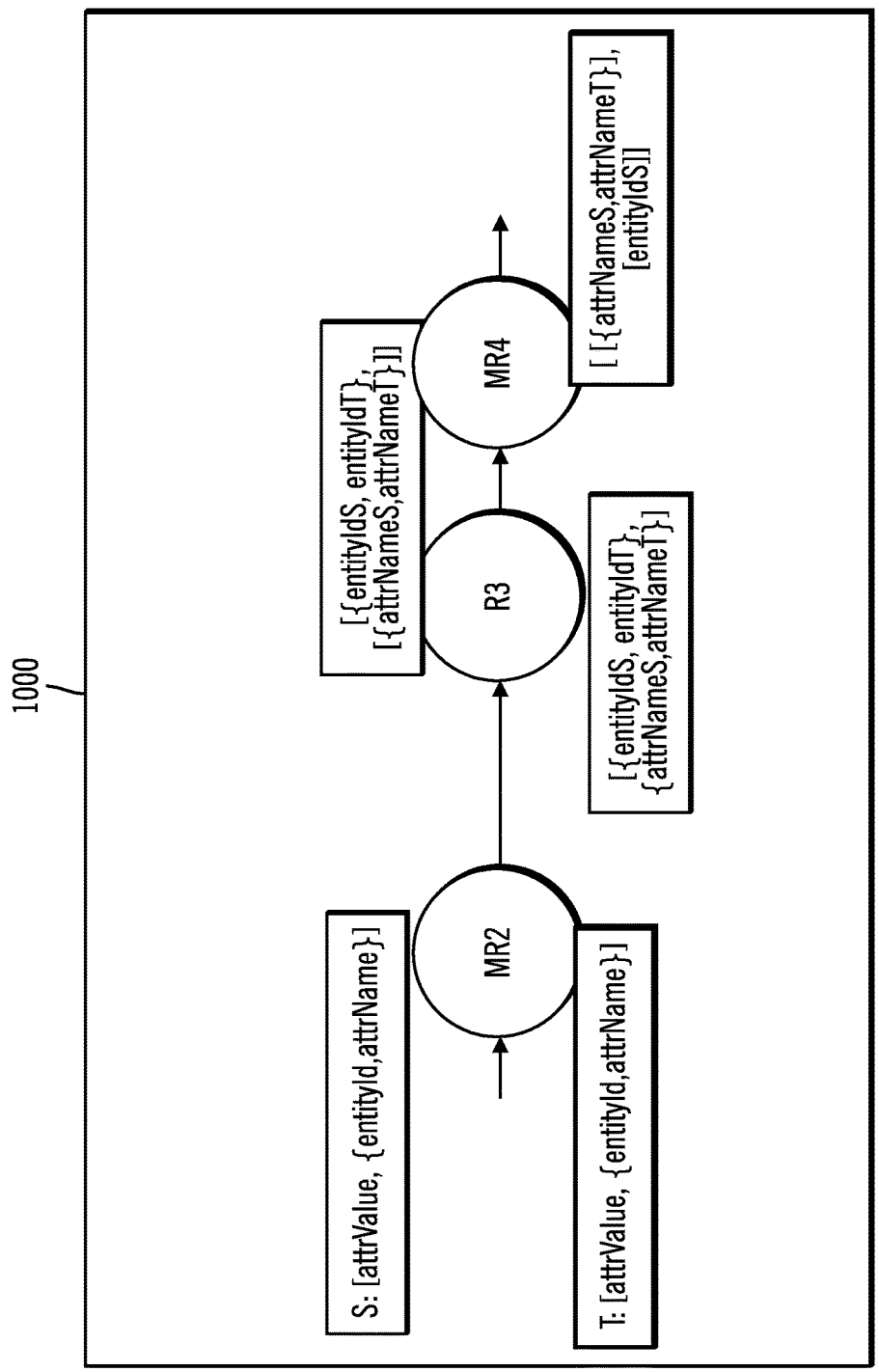
FIG. 10 illustrates further processing in accordance with certain embodiments.

FIG. 10 illustrates further processing 900 in accordance with certain embodiments. The output of this stage is list of possible entity definitions and support of each of them. After the processing of MR4, the following inputs are received from the user: 1. entity definition and 2. context attributes. The reverse index is built for data asset S as well as data asset T as per FIG. 10. These indices are then combined over the keys, and every value from data asset S under a key is combined with every value from T under the same key. This process is repeated for all the keys which are common on both the sides.

This results in entity identifiers from S and T (entityIdS and entityIdT, respectively) paired against the corresponding attribute names (attrNameS and attrNameT, respectively).

The attribute name pairs are then aggregated by entity identifier (ID) pairs. This process collects all attribute names under entityIdS and entityIdT which have matched on some value.

Finally, entity identifiers which match on similar combinations of attribute names are collected together. Each unique combination of attributes serves as an Entity Mapping.

Figure 11:
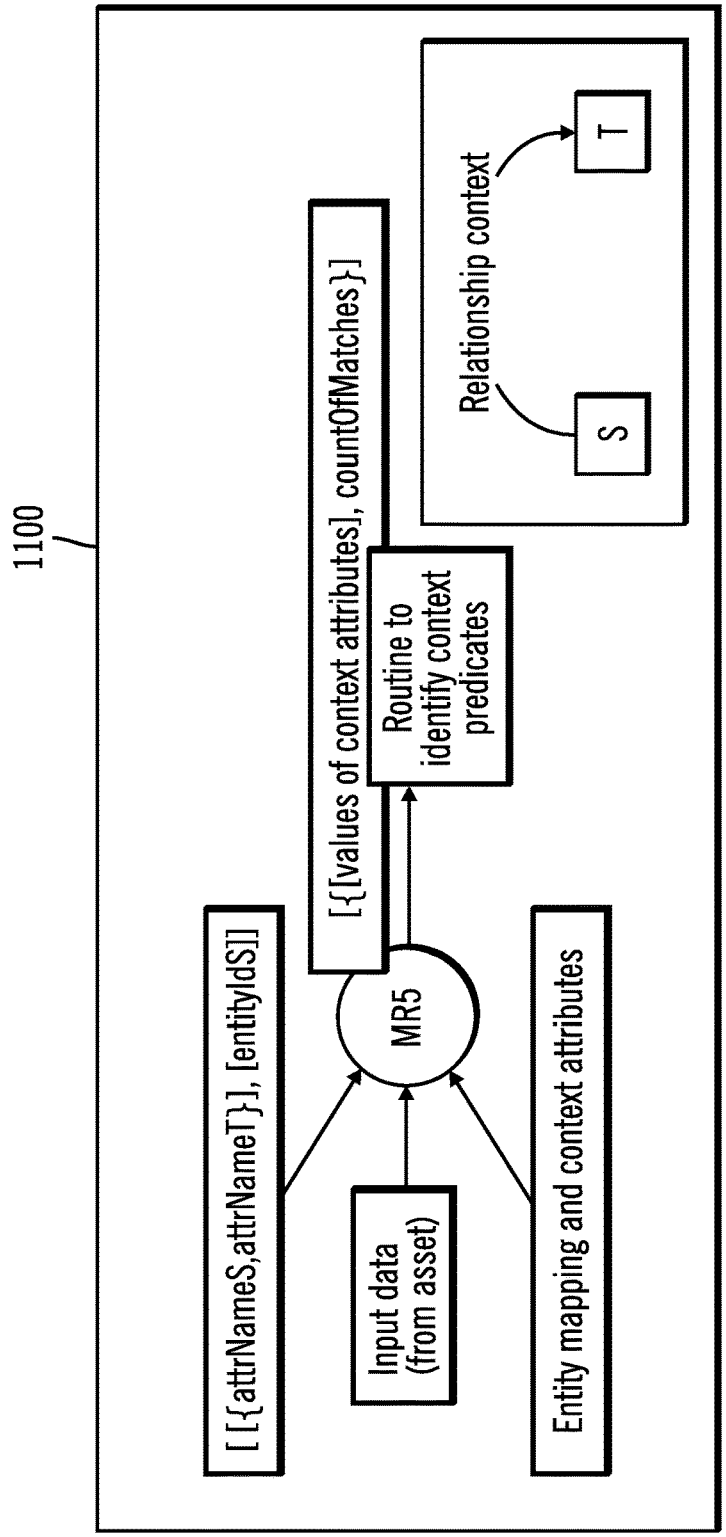
FIG. 11 illustrates further processing in accordance with certain embodiments.

FIG. 11 illustrates further processing 1100 in accordance with certain embodiments. This optional processing is responsible for discovery of contexts which may horizontally partition the data based on attribute value filtering. Given the list of entity mappings discovered earlier, optionally a set of context attributes pre-defined by the user, and the original data of the data asset, the processing of MR5 and the routine to identify context predicates, discovers predicates on a subset of context attributes with user-defined parameters.

Figure 12:
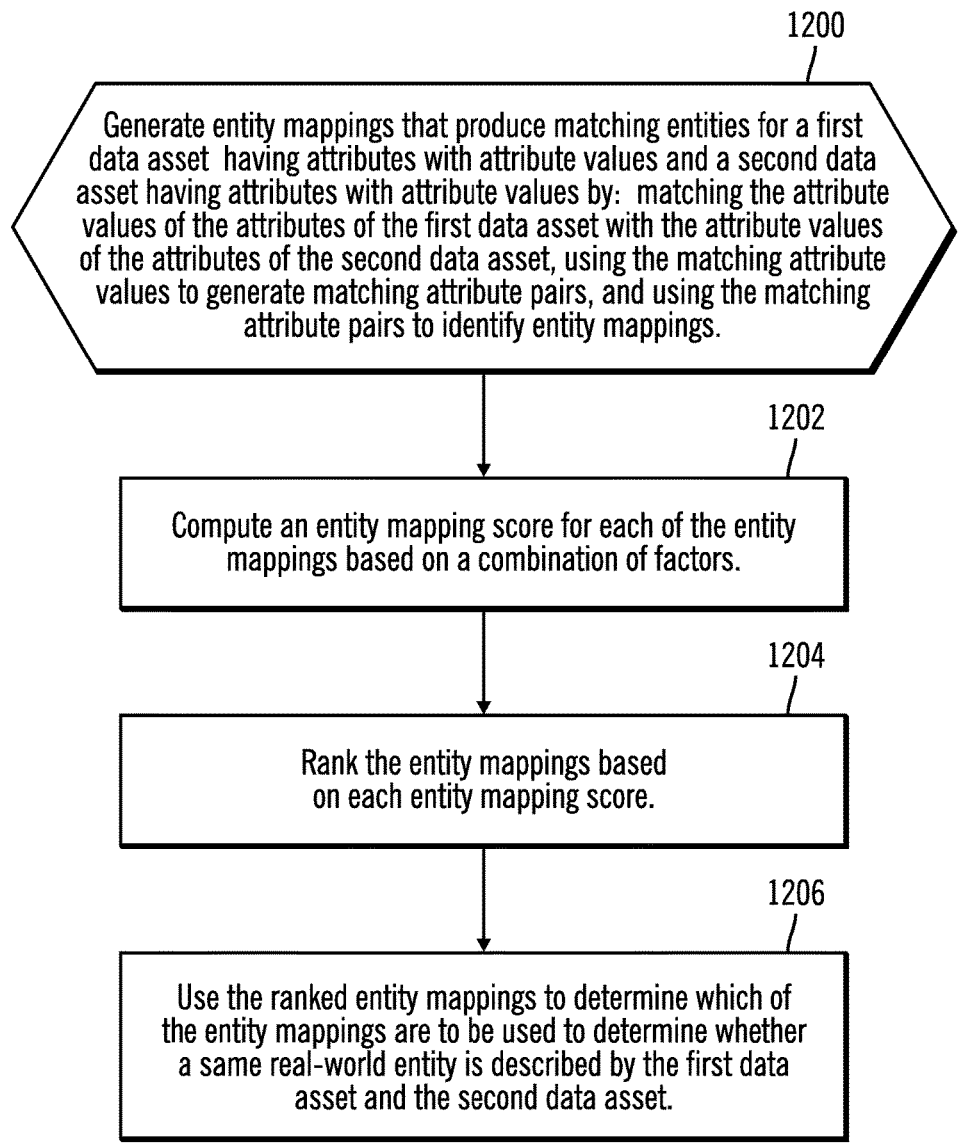
FIG. 12 illustrates, in a flowchart, operations to identify entity mappings that are to be used to determine whether a same real-world entity is described by the first data asset and the second data asset in accordance with certain embodiments.
Figure 13:
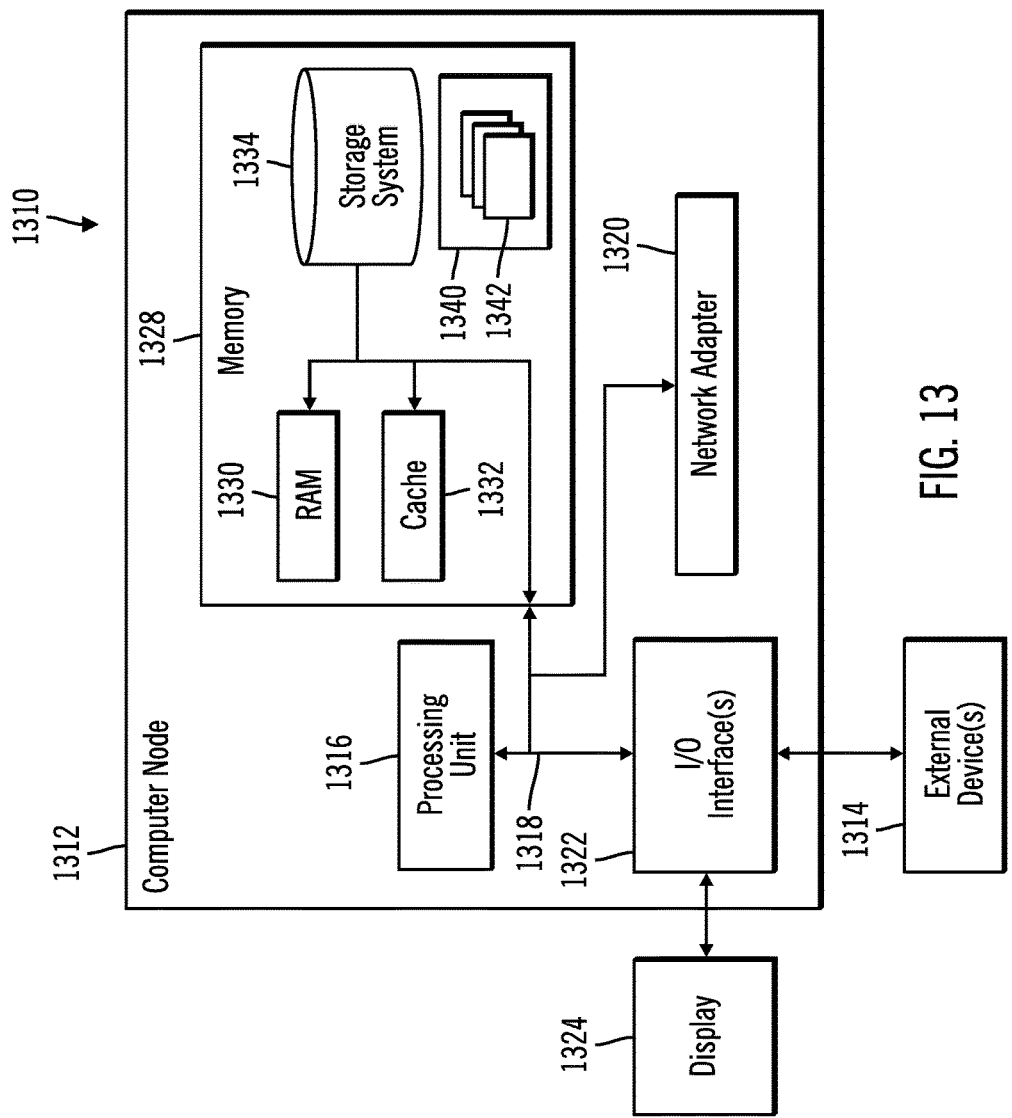
FIG. 13 illustrates a cloud computing node in accordance with certain embodiments.

FIG. 12 illustrates, in a flowchart, operations to identify entity mappings that are to be used to determine whether a same real-world entity is described by the first data asset and the second data asset in accordance with certain embodiments. Control begins at block 1200 with the entity mapping identifier 110 generating entity mappings that produce matching entities for a first data asset having attributes and a second data asset having attributes by: generating entity mappings that produce matching entities for a first data asset having attributes with attribute values and a second data asset having attributes with attribute values by: matching the attribute values of the attributes of the first data asset with the attribute values of the attributes of the second data asset, using the matching attribute values to generate matching attribute pairs, and using the matching attribute pairs to identify entity mappings. In block 1202, the entity mapping identifier 110 computes an entity mapping score for each of the entity mappings based on a combination of factors. In block 1204, the entity mapping identifier 110 ranks the entity mappings based on each entity mapping score. In block 1206, the entity mapping identifier 110 uses the ranked entity mappings to determine which of the entity mappings are to be used to determine whether a same real-world entity is described by the first data asset and the second data asset.

Embodiments provide extensions to semi-structured data assets. A semi-structured data asset is another form of structured data that does not follow traditional RDBMS like table format. Semi-structured data (e.g., XML or JSON data) has a schema associated with it. A semi-structured data asset may be converted into a structured data asset with an annotated XML schema decomposition" technique. First, the XML schema is shred into a set of tables, and then the data is inserted into the tables accordingly, while ensuring that the entity identifier is appropriately associated with each of the records in the tables. The same technique applied for structured data may be applied for semi-structured data assets now.

For semi-structured data asset to semi-structured data asset processing, given two data assets A and B, the entity mapping identifier 110 creates an attribute value dictionary for both DA and DB. Each entry in an attribute value dictionary is of the form $\{v_j:a_i, v_j \subset Range(a_i)\}$, where $a_i$ is a column of the data asset in concern. The entity mapping identifier 110 performs a cartesian product between DA and DB to collect similar values of the form, $\{v\_j:a\_i:r\_m, b\_k:s\_n\}$, where $r\_m$ is the entity from A and $s\_n$ is an entity of B. The entity mapping identifier 110 computes support and confidence of all entity mappings for a pair of entity mapping $r\_m$ and $s\_n$, of the form, $\{r\_m,s\_n:a\_i1:b\_k1, a\_i2:b\_k2 \ldots a\_ix:b\_kx\}$. Then, the entity mapping identifier 110 emits each entity mapping that satisfies a user given threshold.

For semi-structured data asset to structured data asset processing, given two data assets A and B, where data asset B is unstructured, the entity mapping identifier 110 creates an attribute value dictionary for DA. For every entity (document) of B, the entity mapping identifier 110 annotates the tokens with respect to DA. The entity mapping identifier 110 creates DB with the respective annotated values. The entity mapping identifier 110 performs a cartesian product between DA and DB to collect similar values of the form, $\{v\_j:a\_i:r\_m, b\_k:s\_n\}$, where $r\_m$ is the entity from A and $s\_n$ is an entity of B. The entity mapping identifier 110 computes support and confidence of all entity mappings for a pair of entity mapping $r\_m$ and $s\_n$, of the form, $\{r\_m, s\_n:a\_i1:b\_k1, a\_i2:b\_k2 \ldots a\_ix:b\_kx\}$. Then, the entity mapping identifier 110 emits each entity mapping that satisfies a user given threshold.

In certain embodiments the entity mapping identifier 110 applies entity resolution techniques to discover how two data sources may be related to each other by performing entity resolution on the data in those sources to reverse-engineer the matching references.

Thus, embodiments generate entity mappings that produce matching entities for a first data asset and a second data asset, compute an entity mapping score for the entity mappings, and rank the mappings based on the entity mapping scores.

With embodiments, generating the entity mappings includes generating a first inverted index of entity identifier pairs for the first data asset, generating a second inverted index of entity identifier pairs for the second data asset, and using the first inverted index and the second inverted index to get matching entity pairs based on a number of entity mappings, and calculate scores of various entity mappings. With embodiments, the first data asset and the second data asset are each one of structured data, unstructured data, and semi-structured data. In certain embodiments, the matching entities are ranked based on a combination of factors.

Also, embodiments integrate the first data asset and the second data asset using ranked matching entities by performing one of a join operation, a merge operation, and a union operation. Data integration may be described as the process of combining the data from one asset to one or more related data assets in order to generate a holistic view. The end result of the integration varies depending on the operation carried out to integrate the assets. The process depicted in FIG. 4 is one embodiment that can generate join keys between two data assets based on which these assets can be integrated.

Data assets may be database tables (structured data assets), XML or JSON tree formatted data (semi-structured), or natural language textual data. The entity mapping may be used to know whether a common set of entities are being described in both the data assets. The entity mapping provides list of columns/tags/annotations that are compared to know whether there is any common entity. Unlike the traditional methods of schema mapping that work with data schema, embodiments use the data instances to identify the entity mappings and their supports.

Traditionally data mapping is done manually where some expert needs to know all the data assets and define schema mapping among them. With the volume and variety of big data, this may no longer be possible. In such scenarios, there is typically a large amount of data that is discovered, integrated, and processed for various analytics requirements. There are various techniques for data integration—join, entity merge, union, etc. For data discovery and integration, the user needs to understand the entity mapping between data assets to answer questions such as: which data assets should be used for a particular requirement, whether the data assets should be integrated, what method can be used for integration, etc. Embodiments answer these questions.

Embodiments provide automated data linking, multi-asset data profiling, scalable data linking and profiling, and profiling semi-structured and unstructured data assets.

With automated data linking, some techniques are manual where a subject matter expert maps columns in one data asset to that of another data asset, while other techniques identify primary key-foreign key relationships by assuming that mapping involves primary key of one of the data assets. Embodiments make no such assumption while providing method of finding entity mappings for data assets.

Some techniques profile data assets independently—cardinality, value distribution, patterns and data types, foreign key dependencies, etc., are profiled for a single data asset (and its columns). In comparison, embodiments perform data profiling over multiple data assets to figure out data overlap by detecting duplicates (Union), linkages (Complement), multiple representations of the same real-world entities, or to discover an entity to complement an existing one.

With scalable data linking and profiling, embodiments propose using distributed computing platform (e.g., a map—reduce platform) for scalable data linking and profiling.

With profiling semi-structured and unstructured data assets, embodiments are applicable for wide variety of data assets—structured, semi-structured and unstructured.

Figure 14:
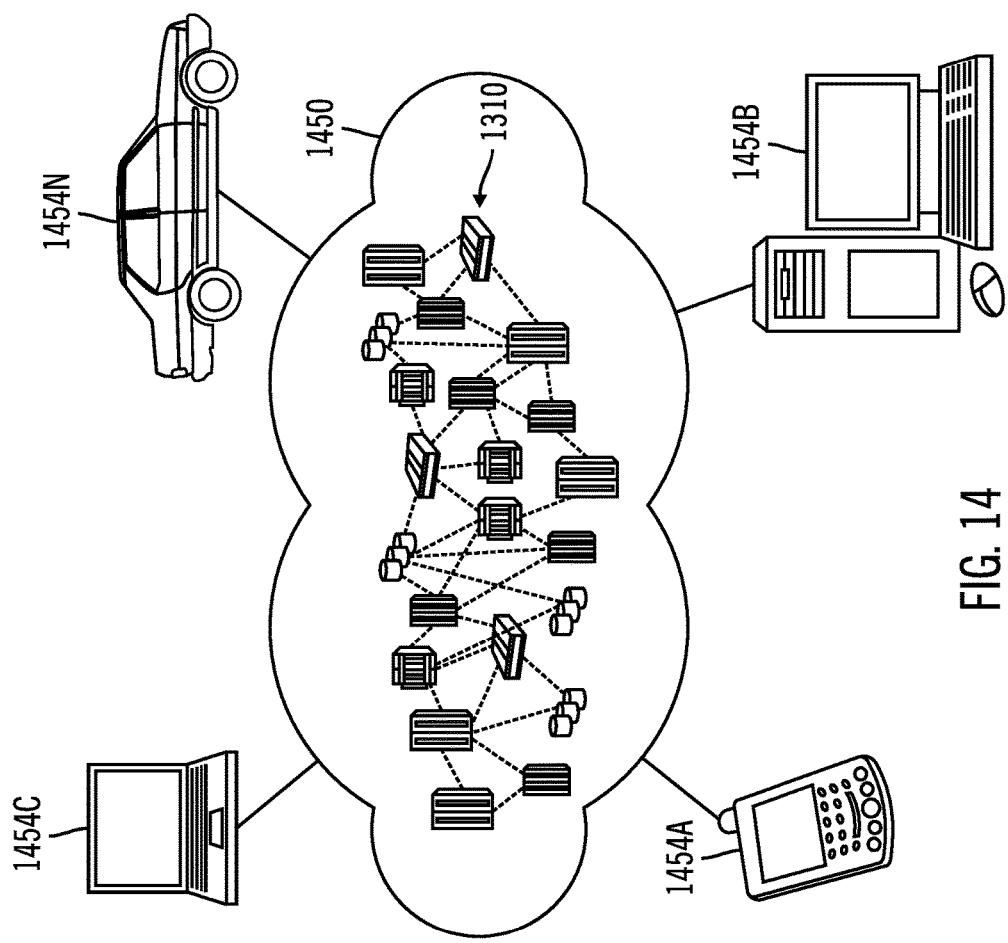
FIG. 14 illustrates a cloud computing environment in accordance with certain embodiments.

Referring now to FIG. 14, a schematic of an example of a cloud computing node is shown. Cloud computing node 1410 is only one example of a suitable cloud computing node and is not intended to suggest any limitation as to the scope of use or functionality of embodiments of the invention described herein. Regardless, cloud computing node 1410 is capable of being implemented and/or performing any of the functionality set forth hereinabove.

In cloud computing node 1410 there is a computer system/server 1412, which is operational with numerous other general purpose or special purpose computing system environments or configurations. Examples of well-known computing systems, environments, and/or configurations that may be suitable for use with computer system/server 1412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1412 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 14, computer system/server 1412 in cloud computing node 1410 is shown in the form of a general-purpose computing device. The components of computer system/server 1412 may include, but are not limited to, one or more processors or processing units 1416, a system memory 1428, and a bus 1418 that couples various system components including system memory 1428 to processor 1416.

Bus 1418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1412 typically includes a variety of computer system readable media. Such media may be any available media that is accessible by computer system/server 1412, and it includes both volatile and non-volatile media, removable and non-removable media.

System memory 1428 can include computer system readable media in the form of volatile memory, such as random access memory (RAM) 1430 and/or cache memory 1432. Computer system/server 1412 may further include other removable/non-removable, volatile/non-volatile computer system storage media. By way of example only, storage system 1434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1418 by one or more data media interfaces. As will be further depicted and described below, memory 1428 may include at least one program product having a set (e.g., at least one) of program modules that are configured to carry out the functions of embodiments of the invention.

Program/utility 1440, having a set (at least one) of program modules 1442, may be stored in memory 1428 by way of example, and not limitation, as well as an operating system, one or more application programs, other program modules, and program data. Each of the operating system, one or more application programs, other program modules, and program data or some combination thereof, may include an implementation of a networking environment. Program modules 1442 generally carry out the functions and/or methodologies of embodiments of the invention as described herein.

Computer system/server 1412 may also communicate with one or more external devices 1414 such as a keyboard, a pointing device, a display 1424, etc.; one or more devices that enable a user to interact with computer system/server 1412; and/or any devices (e.g., network card, modem, etc.) that enable computer system/server 1412 to communicate with one or more other computing devices. Such communication can occur via Input/Output (I/O) interfaces 1422. Still yet, computer system/server 1412 can communicate with one or more networks such as a local area network (LAN), a general wide area network (WAN), and/or a public network (e.g., the Internet) via network adapter 1420. As depicted, network adapter 1420 communicates with the other components of computer system/server 1412 via bus 1418. It should be understood that although not shown, other hardware and/or software components could be used in conjunction with computer system/server 1412. Examples, include, but are not limited to: microcode, device drivers, redundant processing units, external disk drive arrays, RAID systems, tape drives, and data archival storage systems, etc.

In certain embodiments, the computing device 100 has the architecture of computing node 1410. In certain embodiments, the computing device 100 is part of a cloud environment. In certain alternative embodiments, the computing device 100 is not part of a cloud environment.

Cloud Embodiments

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 14, illustrative cloud computing environment 1450 is depicted. As shown, cloud computing environment 1450 comprises one or more cloud computing nodes 1010 with which local computing devices used by cloud consumers, such as, for example, personal digital assistant (PDA) or cellular telephone 1454A, desktop computer 1454B, laptop computer 1454C, and/or automobile computer system 1454N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1450 to offer infrastructure, platforms and/or software as services for which a cloud consumer does not need to maintain resources on a local computing device. It is understood that the types of computing devices 1454A-N shown in FIG. 14 are intended to be illustrative only and that computing nodes 1010 and cloud computing environment 1450 can communicate with any type of computerized device over any type of network and/or network addressable connection (e.g., using a web browser).

Figure 15:
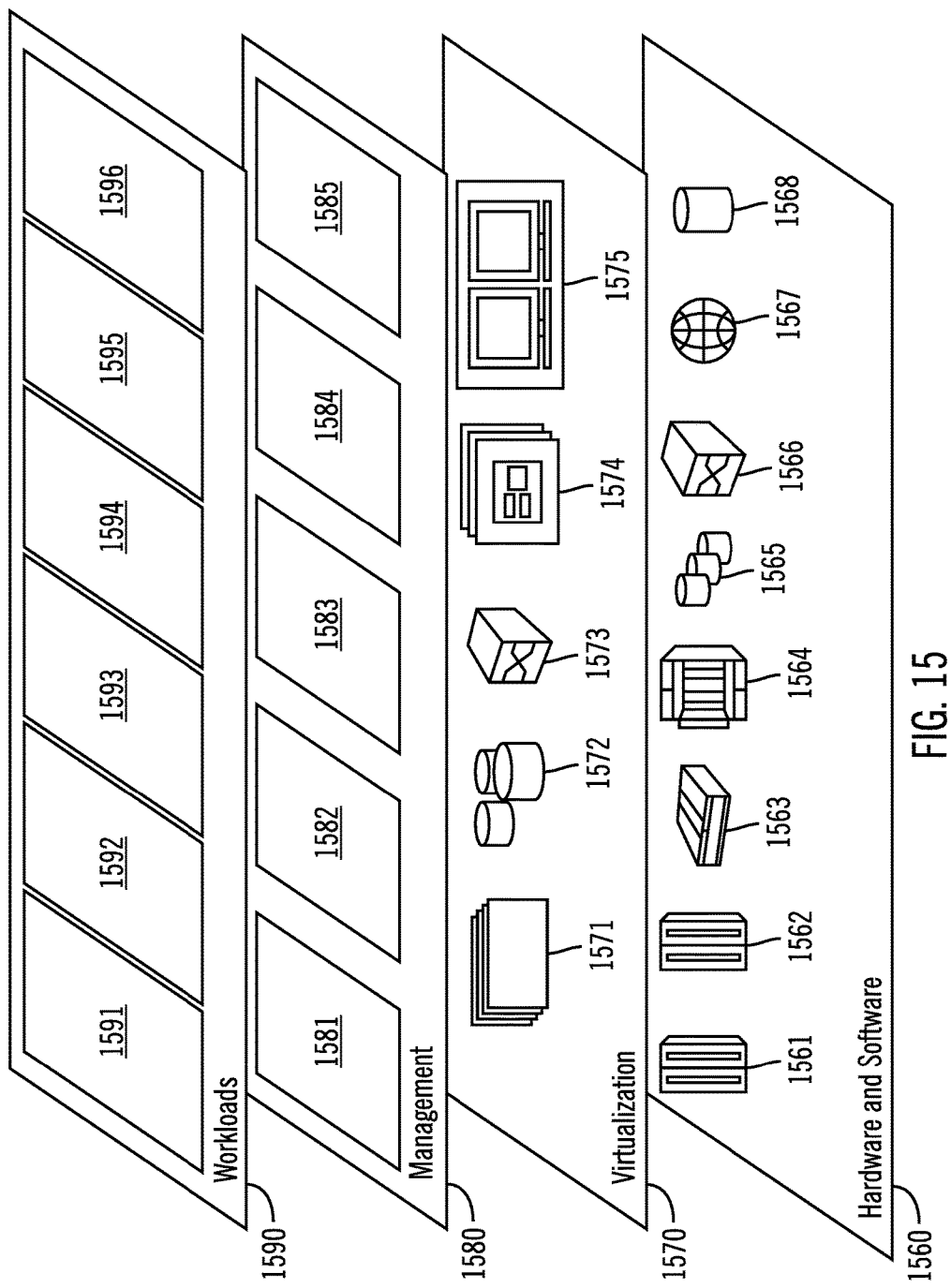
FIG. 15 illustrates abstraction model layers in accordance with certain embodiments.

Referring now to FIG. 15, a set of functional abstraction layers provided by cloud computing environment 1450 (FIG. 14) is shown. It should be understood in advance that the components, layers, and functions shown in FIG. 15 are intended to be illustrative only and embodiments of the invention are not limited thereto. As depicted, the following layers and corresponding functions are provided:

Hardware and software layer 1560 includes hardware and software components. Examples of hardware components include: mainframes 1561; RISC (Reduced Instruction Set Computer) architecture based servers 1562; servers 1563; blade servers 1564; storage devices 1565; and networks and networking components 1566. In some embodiments, software components include network application server software 1567 and database software 1568.

Virtualization layer 1570 provides an abstraction layer from which the following examples of virtual entities may be provided: virtual servers 1571; virtual storage 1572; virtual networks 1573, including virtual private networks; virtual applications and operating systems 1574; and virtual clients 1575.

In one example, management layer 1580 may provide the functions described below. Resource provisioning 1581 provides dynamic procurement of computing resources and other resources that are utilized to perform tasks within the cloud computing environment. Metering and Pricing 1582 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1583 provides access to the cloud computing environment for consumers and system administrators. Service level management 1584 provides cloud computing resource allocation and management such that required service levels are met. Service Level Agreement (SLA) planning and fulfillment 1585 provide pre-arrangement for, and procurement of, cloud computing resources for which a future requirement is anticipated in accordance with an SLA.

Workloads layer 1590 provides examples of functionality for which the cloud computing environment may be utilized. Examples of workloads and functions which may be provided from this layer include: mapping and navigation 1591; software development and lifecycle management 1592; virtual classroom education delivery 1593; data analytics processing 1594; transaction processing 1595; and prior compare processing 1596.

Thus, in certain embodiments, software or a program, implementing prior compare processing in accordance with embodiments described herein, is provided as a service in a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
generating entity mappings that produce matching entities for a first data asset having attributes with attribute values and a second data asset having attributes with attribute values by:
matching the attribute values of the attributes of the first data asset with the attribute values of the attributes of the second data asset;
using the matching attribute values to generate matching attribute pairs; and
using the matching attribute pairs to identify entity mappings;
computing an entity mapping score for each of the entity mappings based on a combination of factors;
ranking the entity mappings based on each entity mapping score; and
using the ranked entity mappings to determine which of the entity mappings are to be used to determine whether a same real-world entity is described by the first data asset and the second data asset.

2. The method of claim 1, further comprising:
generating a first inverted index of entity identifier pairs for the first data asset;
generating a second inverted index of entity identifier pairs for the second data asset; and
using the first inverted index and the second inverted index to generate the matching attribute pairs based on matching attribute values that form the entity mappings.

3. The method of claim 1, wherein values match fuzzily for the matching entities.

4. The method of claim 1, wherein computing the entity mapping score for each of the entity mappings comprises:

generating an entity mapping score for factors selected from: a number of attributes involved in an entity mapping, a cardinality of that individual entity mapping, support of that entity mapping, a probability of one to one matching for that entity mapping, a join utility measure for that entity mapping, and a probability of previous user selections for that entity mapping; and adding the entity mapping score for each of the factors to generate the entity mapping score for that entity mapping.

5. The method of claim 1, wherein one of the first data asset and the second data asset is semi-structured data having hierarchical data that is flattened.

6. The method of claim 1, wherein one of the first data asset and the second data asset is an unstructured data asset formed by a collection of documents and is modelled based one of a bag of words and annotated words.

7. The method of claim 1, further comprising:

integrating the first data asset and the second data asset using ranked entity mappings by performing one of a join operation, a merge operation, and a union operation.

8. The method of claim 1, wherein Software as a Service (SaaS) is configured to perform method operations.

* * * * *